US012608628B2

(12) United States Patent
Ferreira Costa et al.

(10) Patent No.: US 12,608,628 B2
(45) Date of Patent: Apr. 21, 2026

(54) PREDICTION ENHANCEMENT FOR CLASSIFICATION MODELS

(71) Applicant: SAP SE, Walldorf (DE)

(72) Inventors: Guilherme Ehrhardt S. Ferreira Costa, Lisbon (PT); Jan Portisch, Bruchsal (DE)

(73) Assignee: SAP SE, Walldorf (DE)

( * ) Notice: Subject to any disclaimer, the term of this patent is extended or adjusted under 35 U.S.C. 154(b) by 855 days.

(21) Appl. No.: 17/885,963

(22) Filed: Aug. 11, 2022

(65) Prior Publication Data

US 2024/0054358 A1       Feb. 15, 2024

(51) Int. Cl.
G06N 5/022          (2023.01)
(52) U.S. Cl.
CPC .................................... G06N 5/022 (2013.01)

(58) Field of Classification Search
None
See application file for complete search history.

(56) References Cited

U.S. PATENT DOCUMENTS

| | | | |
|---|---|---|---|
| 10,673,880 B1* | 6/2020 | Pratt | H04L 63/1425 |
| 2018/0307723 A1* | 10/2018 | Bhargava | G06F 16/2457 |
| 2020/0356868 A1* | 11/2020 | Khare | G06N 20/00 |
| 2023/0030064 A1* | 2/2023 | Adib | G16H 50/20 |

* cited by examiner

*Primary Examiner* — Mark D Featherstone
(74) *Attorney, Agent, or Firm* — Buckley, Maschoff & Talwalkar LLC

(57) ABSTRACT

Systems and methods provide reception of an identifier of a machine learning classification model and a prediction generated by the machine learning classification model, identification of model configuration data associated with the machine learning classification model, modification of the prediction based on the model configuration data to generate an enhanced prediction comprising calibrated probabilities, and returning of the enhanced prediction.

14 Claims, 11 Drawing Sheets

600

S610
RECEIVE MODEL ID AND PREDICTION

S620
IDENTIFY MODEL CONFIGURATION DATA

S630
CALIBRATION FUNCTION?

S640
APPLY CALIBRATION FUNCTION TO PREDICTION

Yes

No

S650
TRAINING SET CLASS SIZES?

S660
ADAPT PREDICTION TO BALANCED SET

Yes

No

S670
CLASS GROUPING GRAPH ?

S680
ENFORCE CLASS GROUPING

Yes

No

S690
RETURN ENHANCED PREDICTION

PREDICTION ENHANCEMENT FOR CLASSIFICATION MODELS

BACKGROUND

Modern enterprises produce, use and store large amounts of data. The data may be stored in database tables, files or other data structures. Users interact with applications executing on servers (e.g., on-premise or cloud-based) to view, create and update the data. Interactions between the applications and the data are facilitated by metadata which describes the semantics of the data.

Applications may use machine learning models (e.g., as statistical models) to provide predictions to their users. A machine learning model may be trained based on data associated with an application, and then used to generate predictions based on new data. In the case of a classification model, the prediction identifies the probability that an observation belongs to a particular class. For example, a set of data may be collected representing the operation of a network connection over a particular time period. A trained classification model may receive the data and predict whether the data represents a network attack or a normal connection.

Enterprises would like to determine the "quality" of trained models before deploying the models to users. That is, an administrator of a trained model would like to ensure that the predictions of a model will appear subjectively reliable to users. However, there is no universally agreed-upon metric of model quality because, among other reasons, the apparent reliability of a model's predictions depends on the context in which the model is used.

Exacerbating this problem, the context in which a model will be used is frequently unclear or even undefined. For example, stakeholders may have anticipated the need for and sponsored the build of a model before defining precisely how it will be used. Stakeholders may also lack information regarding the costs/returns associated with incorrect/correct classifications (e.g., the cost associated with blocking a "normal" user network connection). In other examples, a model is developed simply as a proof-of-concept in which no particular usage context is contemplated.

Those training or selecting models must therefore often assume that, at least initially, no clear predefined metric will be provided against which the "quality" of their models will be judged. Rather, their models will typically be judged by users who have been selected by stakeholders. These users are asked to evaluate the models based on some examples and to report their subjective feedback (e.g., "model looks good", "performance is worse than expected", "doesn't seem to work well in specific scenarios").

Systems are desired to improve the perceived quality of trained machine learning models. Such improvements may increase users' confidence in and adoption of machine learning models, increase willingness to move forward with associated strategic projects and initiatives, and increase the desirability of associated software tools.

DETAILED DESCRIPTION

The following description is provided to enable any person in the art to make and use the described embodiments. Various modifications, however, will remain readily-apparent to those in the art.

The present inventors have identified several factors which negatively affect the perceived performance of trained machine learning classification models and have developed systems for addressing each factor. The factors include the calibration of probabilities predicted by the trained model, the training data set balance, and the perception of relationships between the classes. Embodiments may address only a particular subset of the phenomena, with the particular subset selected based on an anticipated usage context, the degree to which a phenomenon is present, and/or other factors.

Embodiments may improve the perceived quality of any existent machine learning classification model, thereby increasing user confidence therein. Embodiments modify model predictions so that the resulting modified (i.e., enhanced) predictions exhibit "human friendly" characteristics. In particular, the enhanced prediction may reflect calibrated probabilities, may exhibit a highest possible accuracy on a balanced test data set, and/or respects an "expected" class order.

Embodiments may provide a service which may be configured to enhance predictions of one or more existing models. After the service is configured for a given model, the service may be called with the model's original prediction and an enhanced prediction is returned therefrom. The service may be called by a user, by an application providing predictions to users, or by a machine learning service providing predictions to applications.

Figure 1:
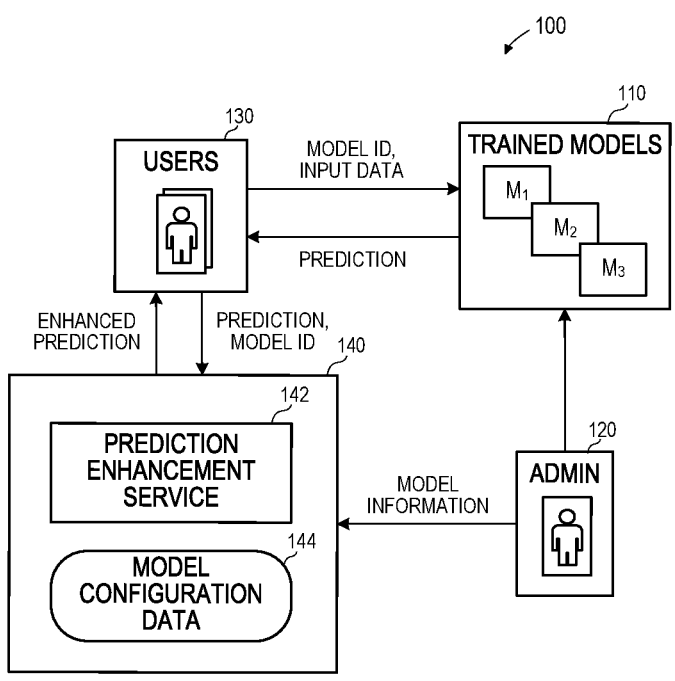
FIG. 1 is a block diagram of an architecture to provide enhanced machine learning model predictions according to some embodiments.

FIG. 1 is a block diagram of architecture 100 to provide enhanced machine learning model predictions according to some embodiments. Architecture 100 is a logical architecture and may be implemented any suitable combination of computing hardware and/or processor-executable program code that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented as a cloud service (e.g., Software-as-a-Service, Platform-as-a-Service) using cloud-based resources, and/or other systems which apportion computing resources elastically according to demand, need, price, and/or any other metric.

Each of trained models 110 receives input data and outputs a probability associated with two or more classes. Each of trained models 110 may be associated with a respective set of two or more output classes and hyperparameters defining the node layers thereof. Models 110 may be trained based on respective initial node and objective functions using supervised and/or unsupervised learning algorithms as is known. In one example of supervised learning, a class output by a model based on each set of training data is compared to a "ground truth" class associated with that set of training data, and internal node weights of the model are adjusted until an aggregated difference, or total loss, between the output target classes and the ground truth target classes is below a threshold.

Each of trained models 110 may be implemented in program code and may comprise any implementations of machine learning classification models that are or become known. Two or more of trained models 110 may be provided by different applications, services and/or providers. In the present example, administrator 120 manages the definition and training of each of trained models 110 to provide desired predictions to users 130.

Administrator 120 may provide model information to prediction enhancement service 142 of server 140. Model information associated with a classification model may comprise but is not limited to a model ID, names of the output classes, a test data set and associated predictions, respective sizes of training set classes, and information regarding subjective similarities between the classes.

Service 142 may use the model information associated with a given model 110 to generate model configuration data 144 for the given model 110. As will be described herein, prediction enhancement service 142 may enhance a prediction generated by the given model 110 based on the model configuration data 144 for the given model 110. Model configuration data 144 may include model configuration data for each of several models, which may be used by prediction enhancement service 142 to enhance predictions generated by each of the several models.

Server 140 may comprise any suitable monolithic, distributed, on-premise and/or cloud-based computing platform for executing program code of prediction enhancement service 142, receiving requests thereto, and providing corresponding responses (e.g., enhanced predictions).

Users 130 may comprise any persons authorized to request inferences from one or more of trained models 110. A user 130 may operate a computing device (e.g., a desktop computer, a laptop computer, a smartphone) to transmit an inference request to trained models 110, where the inference request includes a model ID of a model and input data suitable to that model. Transmission of an inference request from a user 130 to trained models 110 may be performed via one or more intervening applications and/or services, examples of which are provided below.

The trained model 110 associated with the model ID operates on the input data to generate a prediction. The prediction is then returned to the requesting user 130. The user 130 may then call prediction enhancement service 142 to request an enhanced prediction. The call may include the originally-received prediction and the model ID of the model 110 which generated the prediction.

Prediction enhancement service 142 generates an enhanced prediction based on the received prediction and on the stored model configuration data 144 corresponding to the received model ID. The enhanced prediction specifies a probability for each class of the model. The enhanced prediction is returned to the user, possibly with an indication of a predicted class (i.e., the class associated with the highest probability).

Figure 2:
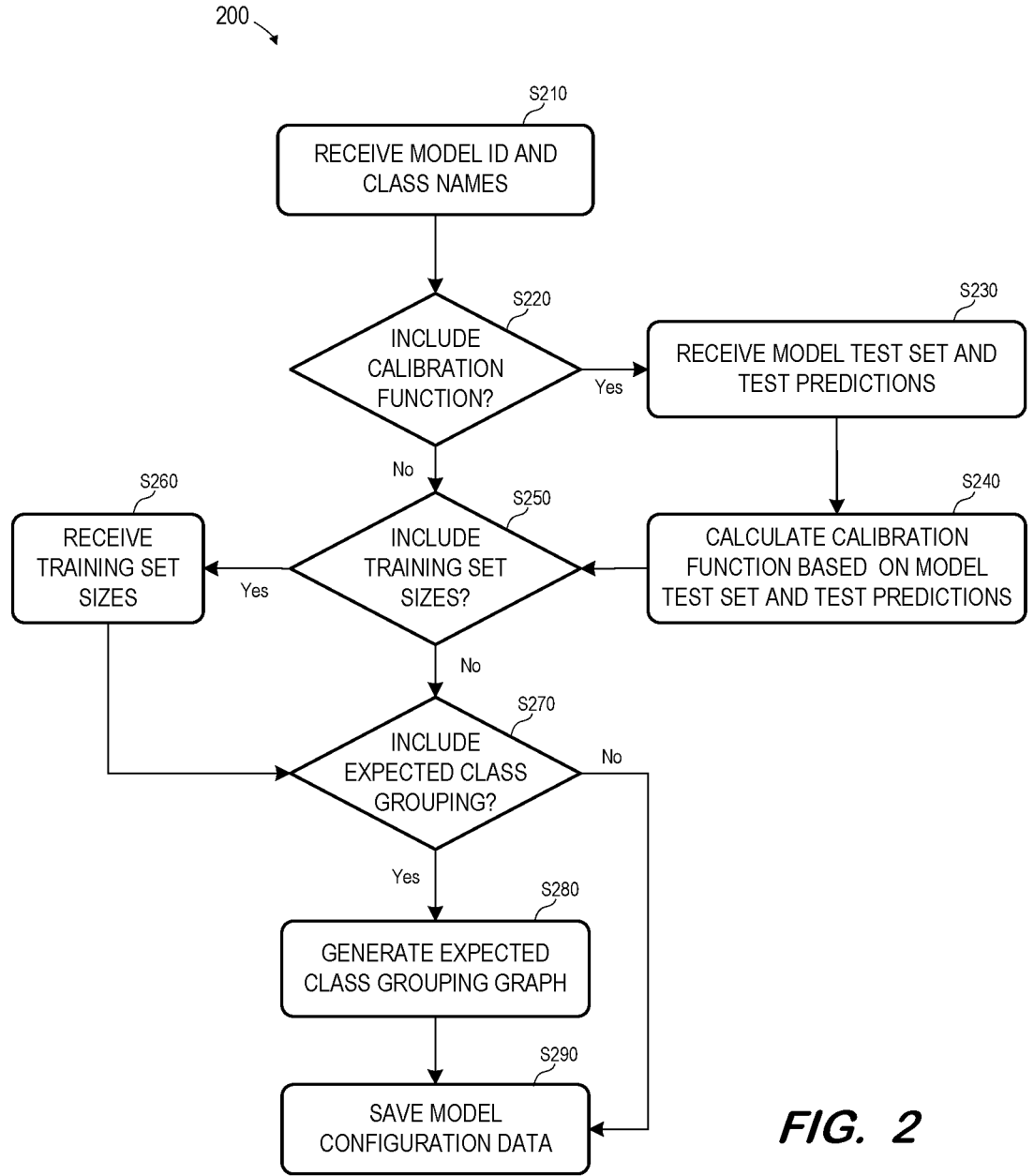
FIG. 2 is a flow diagram of a process to generate model configuration data for generating enhanced machine learning model predictions according to some embodiments.

FIG. 2 illustrates process 200 to generate model configuration data for generating enhanced machine learning model predictions according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, and a magnetic tape, and executed therefrom. Embodiments are not limited to the examples described below.

Process 200 may be initiated by an administrator of a machine learning classification model who wishes to support enhancement of predictions generated by the model as described herein. Initially, a model ID associated with a model and the names of classes predicted by the model are received at S210. In this regard, a classification model typically outputs a set of probabilities, and the class names may be used to provide a user-friendly output. Moreover, the class grouping-based prediction enhancement of some embodiments may be based on configuration data which is generated using the class names as described below.

In some embodiments, an administrator accesses a user interface of a prediction enhancement service to provide the model ID and class names at S210, as well as the other information provided during process 200. In other embodiments, an application operated by an administrator to manage machine learning models may access an API of a prediction enhancement service to provide the information thereto.

Figure 3:
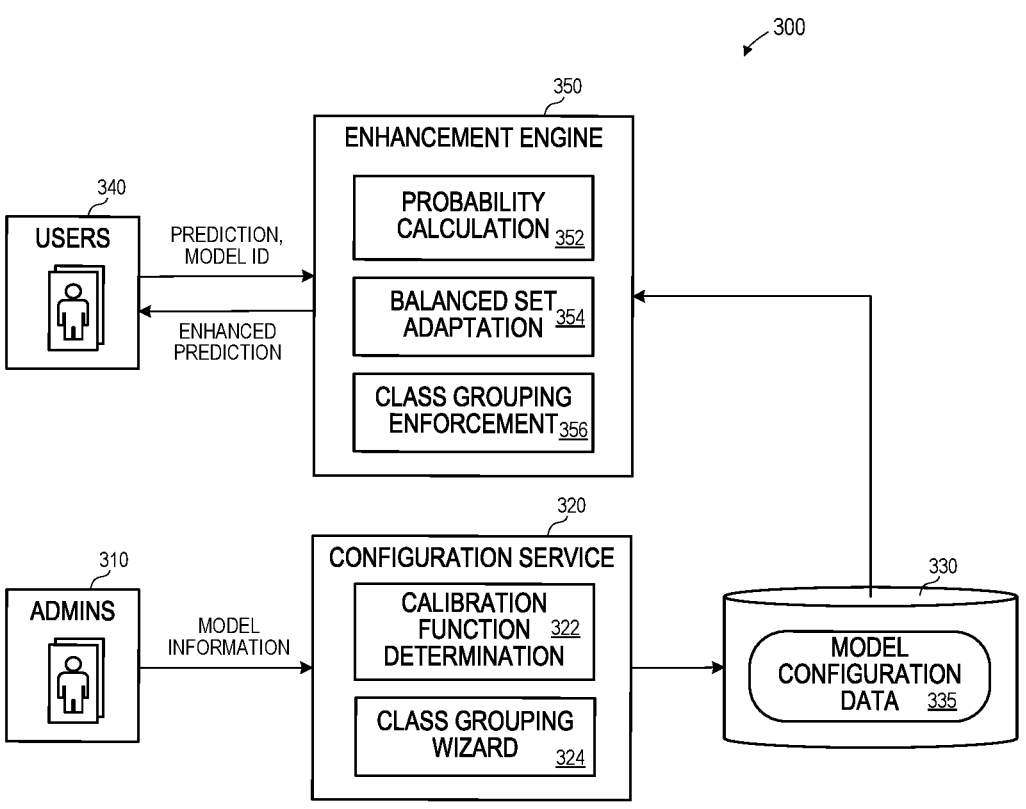
FIG. 3 is a block diagram of an architecture to provide enhanced machine learning model predictions according to some embodiments.

FIG. 3 is a block diagram of architecture 300 according to some embodiments. Architecture 300 may comprise an implementation of architecture 100 but embodiments are not limited thereto.

Architecture 300 divides prediction enhancement service 142 of architecture 100 into two functional components, configuration service 320 and enhancement engine 350. As shown, an administrator 310 calls configuration service 320 to provide model information thereto during process 200. Each of administrators 310 may manage one or more trained models and may therefore call configuration service 320 to provide corresponding model information thereto if desired.

Returning to process 200, it is determined at S220 whether the model configuration data for the model is to include a calibration function. If the values output by the model for each class add up to 1, these values are often considered probabilities. Users expect calibrated probabilities in some contexts, such that 80% of the time that the model outputs (0.2, 0.8), the true class is Class 1. In scenarios where calibrated probabilities are not desired, flow proceeds from S220 to S250.

Figure 4A:
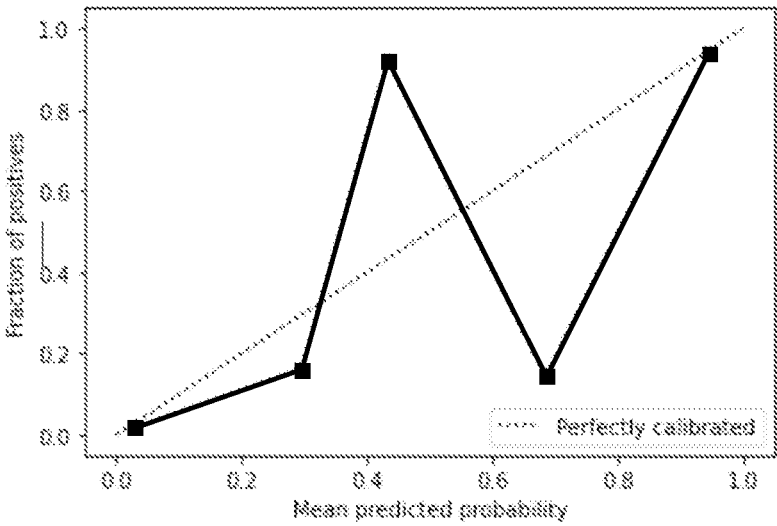
FIGS. 4A and 4B illustrate calibration of predicted probabilities according to some embodiments.
Figure 4B:
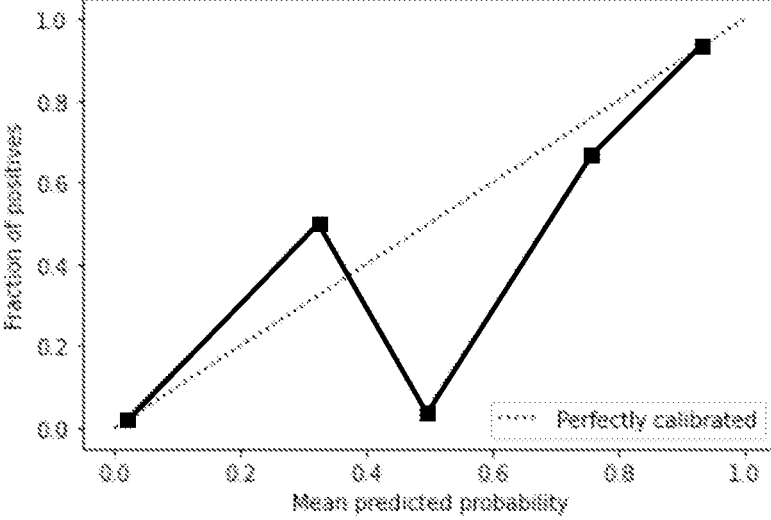

FIG. 4A illustrates a calibration curve of a classification model according to some embodiments. The dotted line represents the behavior described above (i.e., the true class is class 1 80% of the time that the model outputs (0.2, 0.8)), while the solid line reflects the actual response of the model. FIG. 4B illustrates a calibration curve of the same classification model once a calibration function is applied to the original predictions of the classification model according to some embodiments. Accordingly, embodiments may utilize a calibration function to improve the calibration of the values predicted by the model during enhancement of the prediction.

S220 may comprise querying the administrator for a test set $Y_{test}$ and corresponding predictions $\hat{P}_{test}$ generated by the model. If $Y_{test}$ and $\hat{P}_{test}$ are received at S230, a calibration function is calculated at S240 based on $Y_{test}$ and $\hat{P}_{test}$. The calibration function may be calculated by calibration function determination component 322 of service 320.

According to some embodiments of S240, component 322 uses isotonic regression to determine a free form-line $f$ based on $Y_{test}$ and $\hat{P}_{test}$. $\hat{P}_{test}$ is initially normalized to account for classification models which do not output probabilities per class. For example, $$\hat{P}_{test} = \frac{\left(\hat{P}_{test} - \min\left(\hat{P}_{test}\right)\right)}{\max\left(\hat{P}_{test}\right) - \min\left(\hat{P}_{test}\right)}.$$

Next, pairs $(\hat{p}_i, y_i)$ are created and sorted by the first argument of Y. $\hat{Y} = (\widehat{y_1}, \ldots, \widehat{y_n})$ is then determined that minimizes $\Sigma(\hat{y}_i - \hat{y}_i)^2$ subject to $\hat{y}_i \leq \hat{y}l$ for all $(i, j) \in \{(i, j): \hat{p}_i \leq \hat{p}_j\}$. Finally, a non-decreasing function $f$ is selected such that $f(\hat{p}_i) = \hat{y}_l$ for all i (e.g., the linear interpolation between points $(\hat{p}_i, \hat{y}_l)$).

Flow proceeds to S250 from S240 to determine whether the model configuration data should include training set sizes. Models are frequently trained using unbalanced training data sets, in which the number of observations is not the same for all classes. Such models may provide reduced accuracy when applied to balanced data sets. Training set sizes may be used as described below to enhance the accuracy of the model when applied to a balanced data set.

S250 may comprise a query to the administrator or a determination of whether the administrator has provided training set sizes. The training set sizes may comprise a value associated with each class which represents the number of observations in the training set corresponding to that class. The training set sizes are received at S260 if they are to be included in the configuration and flow proceeds to S270.

At S270, it is determined whether the model configuration data should include an expected class grouping. In this regard, a model's predicted probabilities do not always respect the expected groupings of a given set of classes. These expectations may be caused because some classes are more similar to each other than to other classes.

For example, a model may be associated with the following attack-related classes: normal, smurf, neptune, back, satan, ipsweep, portsweep, warezclient. A user with cyber-security knowledge may question the accuracy of a prediction which indicates smurf as the most probable class followed by ipsweep, because smurf is a DDOs attack and ipsweep a Probing attack.

Accordingly, flow proceeds to S280 if expected class groupings are to be considered during prediction enhancement for the model. An expected class grouping graph may be generated at S280 by class grouping wizard 324 of configuration service 320. Class grouping wizard 324 may generate a graph associating classes by presenting a series of queries to an administrator 310 using the class names of the model. In some embodiments, the queries ask, for each class, which other class is most similar.

Figure 5A:
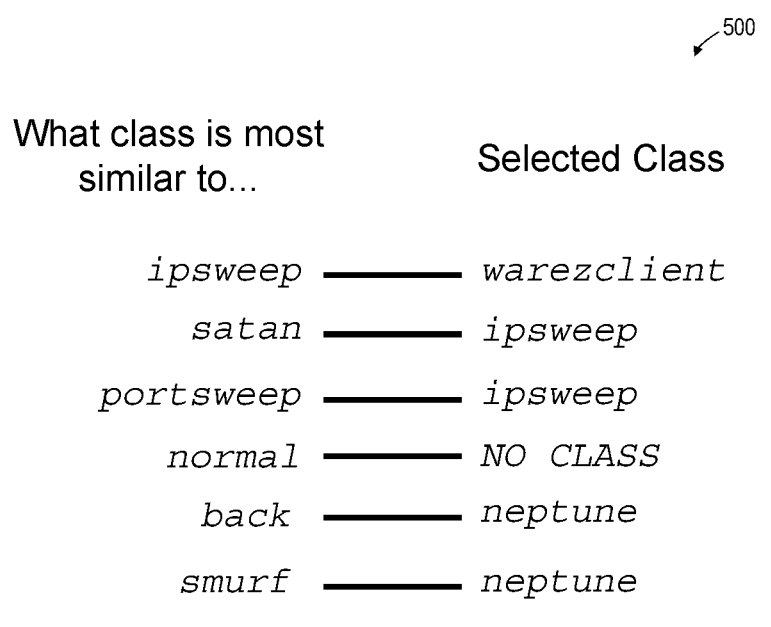
FIG. 5A illustrates determination of class groupings according to some embodiments.

FIG. 5A illustrates user interface 500 including queries presented by class grouping wizard 324 according to some embodiments. For each class, a most-similar class has been selected by the administrator. As shown, on option to select "No Class" as being most-similar is provided. The selected classes may be those which are most similar to a hypothetical user of the model, to an expected group of users (grouped by location, demographic, other), or to the administrator.

Figure 5B:
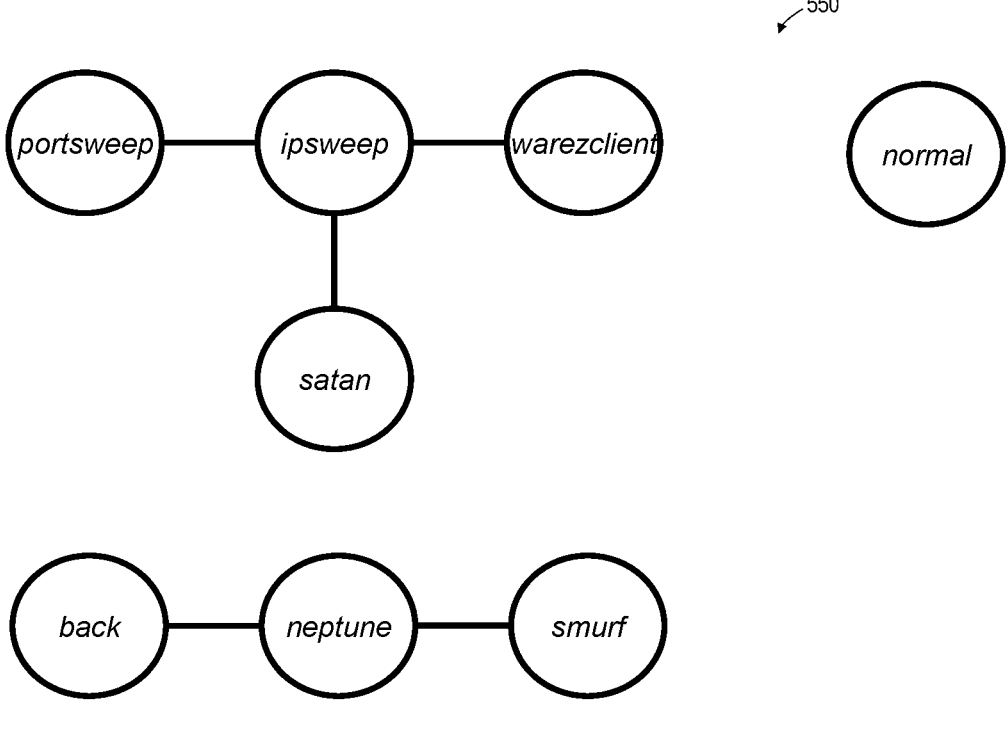
FIG. 5B illustrates a class grouping graph according to some embodiments.

FIG. 5B illustrates graph 550 generated based on the selections of user interface 500 according to some embodiments. Each node represents a single class, and each edge between nodes represents a specified similarity. Since no class was identified as being similar to class normal, no edges are attached to the node corresponding to class normal. Graph 550 therefore depicts three groups of similar classes, each of which is not connected to any other group via an edge. Any type of data structure for representing groups of similar classes may be generated at S280.

Model configuration data is saved at S290. The model configuration includes the model ID and class names received at S210 and may also include one or more of a calibration function, training set sizes, and a class grouping graph. Configuration service 320 may save the model configuration data among model configuration data 335 of storage system 330.

Figure 6:
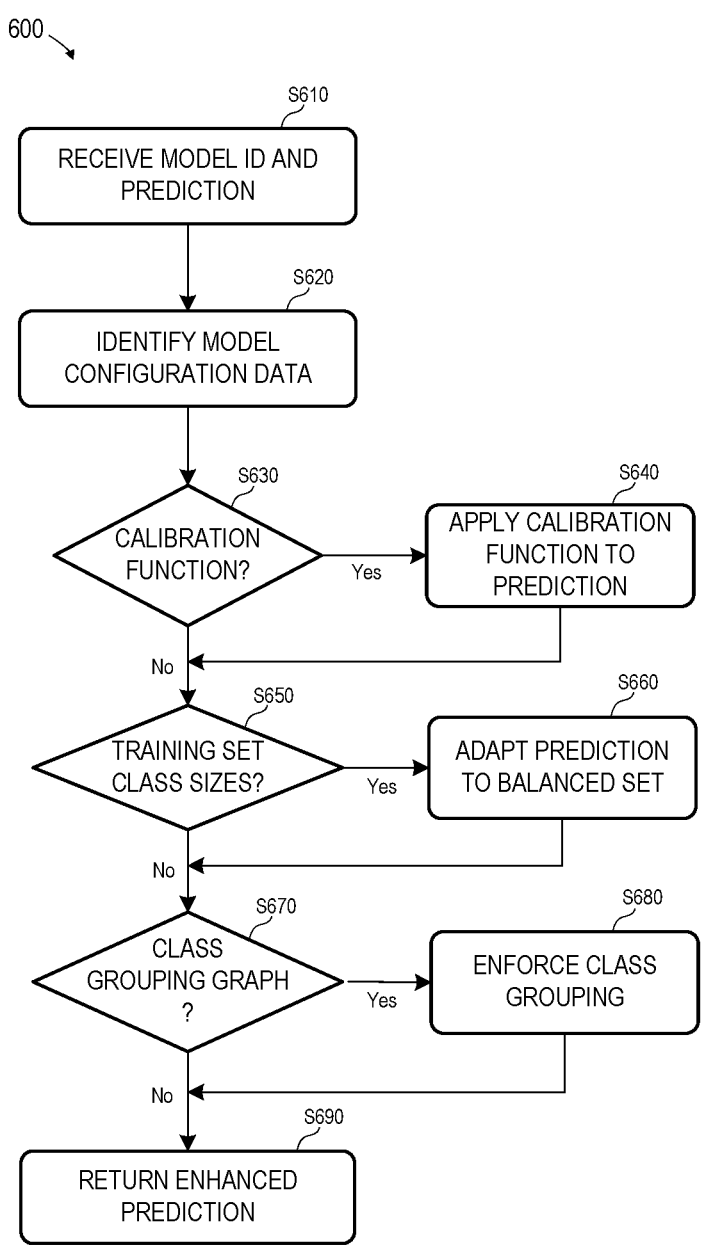
FIG. 6 is a flow diagram of a process to generate an enhanced model prediction based on a prediction and model configuration data according to some embodiments.

FIG. 6 is a flow diagram of process 600 to generate an enhanced model prediction based on a prediction and model configuration data according to some embodiments. Process 600 may be executed by enhancement engine 350 of FIG. 3 or prediction enhancement service 142 of FIG. 1.

Initially, a model ID and prediction are received at S610. The model ID and prediction may be received with a request from a user 340 or an application. The prediction consists of values associated with two or more classes, e.g., p=(0.2, 0.8). Model configuration data associated with the model ID is identified at S620. For example, enhancement engine 350 may query storage system 330 for model configuration data 335 associated with the model ID at S620.

At S630, it is determined whether the identified model configuration data includes a calibration function. As noted above, inclusion of a calibration function is optional in some embodiments. Flow proceeds to S640 if a calibration is included. At S640, the calibration function is applied to the prediction. For example, probability calculation component 352 of enhancement engine 350 may apply the function as $f(p)$ to generate a new prediction.

In the case of a multiclass model having more than two classes, S640 consists of calibrating probabilities for each class separately and then normalizing these probabilities so they sum to one. In such a case, the model configuration data includes a different calibration function $f$ for each class.

At S650, it is determined whether the identified model configuration data includes training set sizes. If so, flow proceeds to S660 to adapt the current prediction (i.e., the prediction resulting from S640 or the original prediction if no calibration was applied) to a balanced test set. Balanced set adaptation component 354 of enhancement engine 350 may perform S660 in some embodiments.

For example, X is the input data to the classification model and Y is the class the model is trying to predict. $\hat{p}_{new} = (1 - p_1, p_1)$ is the output of the model for input x at S660 (i.e., after application of the calibration function, if applied). The training set sizes specified in the model configuration data are $size_1$ for class 1 and $size_0$ for class 0. Given a particular x and using Bayes' Theorem, $$\frac{P(Y=1|X=x)}{P(Y=0|X=x)} = \frac{P(Y=1)}{P(Y=0)} \cdot \frac{P(X=x|Y=1)}{P(X=x|Y=0)}.$$

For any given x, this can be approximated by $$\frac{p_1}{1-p_1} = \frac{size_1}{size_0}.$$

c, where c is a constant mat only depends on x and, using this equation, can be approximated by $$\frac{p_1}{1-p_1} \cdot \frac{size_0}{size_1}.$$

Solving this equation for $p_1$ yields $$p_1 = \frac{\frac{size_1}{size_0} \cdot c}{1 + \frac{size_1}{size_0} \cdot c},$$

from which the change to $p_1$ when the sets are balanced can be estimated. Specifically, in the case of balanced sets, $$\frac{size_1}{size_0} \approx 1 \text{ and } p_{1new} = \frac{\frac{p1}{1-p1} \cdot \frac{size_0}{size_1}}{1 + \frac{p1}{1-p1} \cdot \frac{size_0}{size_1}}.$$

The resulting adapted prediction is $\hat{p}_{new}=(1-p_{1new}, p_{1new})$.

In an example using sample values, it is assumed that $\hat{p}_{new}=(0.2, 0.8)$ and ClassSizes=(500, 100). Accordingly, $$p_{1new} = \frac{\frac{0.8}{1-0.8} \cdot \frac{500}{100}}{1 + \frac{0.8}{1-0.8} \cdot \frac{500}{100}} \approx 0.95,$$

and updated $\hat{p}_{new}=(0.05, 0.95)$.

The foregoing example of S660 assumes a binary (i.e., two class) classification model. For a multiclass model having N classes:

$$\frac{pj}{1-pj} = \frac{size_j}{\sum_{i \neq j} size_i} \cdot c \Rightarrow p_{jnew} = \frac{\frac{p1}{1-p1} \cdot \frac{1}{N-1} \cdot \frac{\sum_{i \neq j} size_i}{size_j}}{1 + \frac{p1}{1-p1} \cdot \frac{1}{N-1} \cdot \frac{\sum_{i \neq j} size_i}{size_j}}$$

It is then determined at S670 whether the model configuration data includes a class grouping graph. If so, flow proceeds to S680 to enforce the class grouping on the current prediction (i.e., the original prediction or the prediction resulting from S640 and/or S660, if executed). S680 may be executed by class grouping enforcement component 356 in some embodiments.

Figure 7:
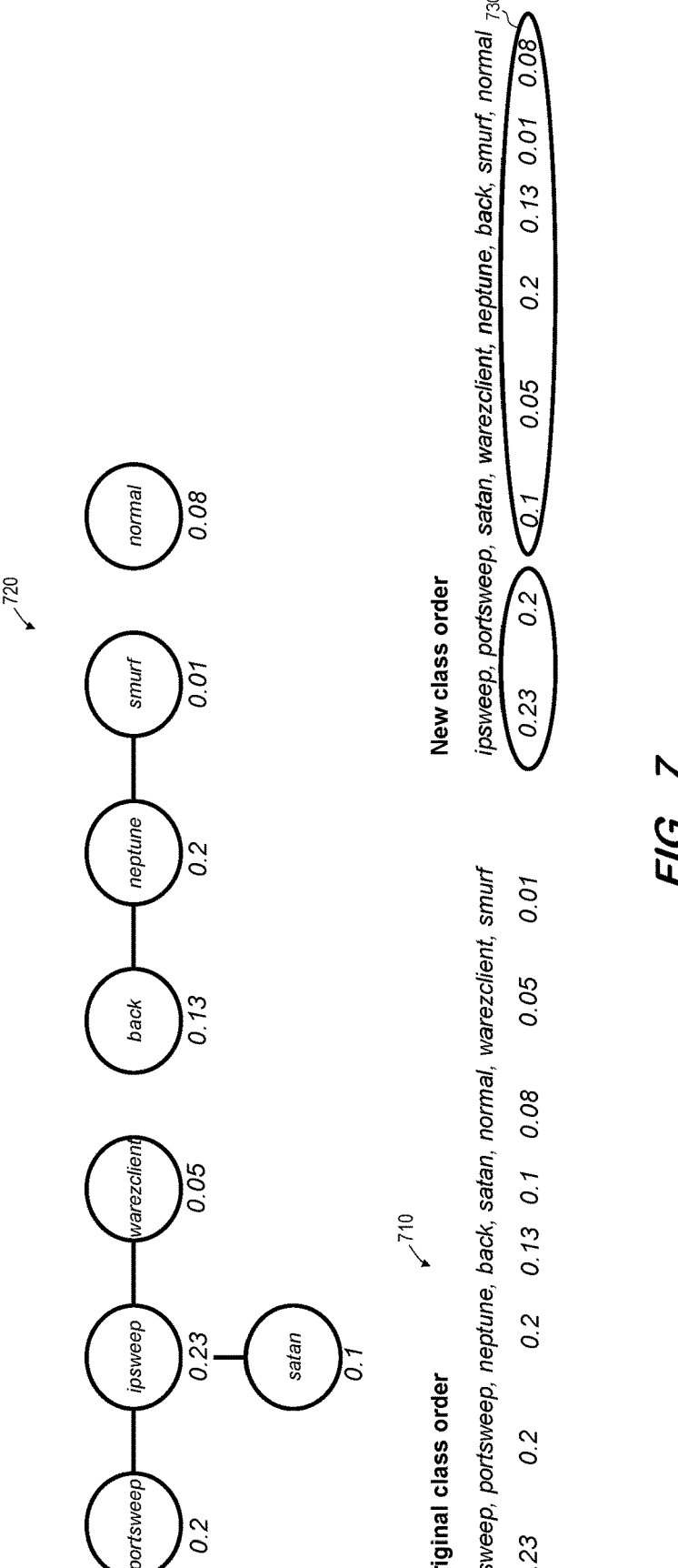
FIG. 7 illustrates class grouping enforcement according to some embodiments.

It will be assumed that the current prediction upon reaching S680 is as depicted by class order 710 of FIG. 7. The probabilities associated with each class may represent the original prediction received at S610 or as modified at S640 and/or S660, depending on whether a calibration function or training set sizes are present in the model configuration data. In this regard, some embodiments allow a user to choose which of the modifications of S640, S660 and S680 to apply to the original prediction, so long as the model configuration data includes information required therefor.

At S680, the class associated with the highest probability is determined (i.e., ipsweep). The class associated with the next-highest probability is determined (i.e., portsweep) and it is then determined whether the two determined classes are associated with (i.e., similar to) one another according to grouping graph 720. In the present example, the ipsweep and portsweep nodes are connected to one another and the classes are therefore determined to be associated.

The class neptune is then determined as being associated with a next-highest probability. However, the neptune node of graph 720 is not connected to the portsweep node or to any other node to which the portsweep node is directly or indirectly connected (i.e., ipsweep, satan, warezclient). Accordingly, probabilities 730 associated with the classes other than ipsweep and portsweep are determined to be inconsistent with the class grouping of the model configuration data.

To account for this inconsistency, and according to some embodiments, probabilities 730 are normalized to a single value, such that all probabilities of the new prediction sum to 1. In the present example, given the prediction (0.095, 0.095, 0.095, 0.095, 0.095, 0.23, 0.2, 0.095) input to S680 for class names ('normal', 'smurf', 'neptune', 'back', 'satan', 'ipsweep', 'portsweep', 'warezclient'), the new prediction is (0.095, 0.095, 0.095, 0.095, 0.095, 0.23, 0.2, 0.095).

An enhanced prediction is returned at S690. The enhanced prediction is the prediction received at S610 as modified by one or more of S640, S660 and S680. According to some embodiments, in the case of a binary classification model, the class associated with the highest probability is returned at S690. For example, given the enhanced prediction $\hat{p}_{new}=$ (0.4, 0.6) for class names=('attack', 'normal'), ((0.4, 0.6), 'normal') may be returned at S690. In the case of a multiclass classification model, a class order is returned, sorted by probability. In the above example, ((0.05, 0.3, 0.15, 0.1, 0.1, 0.1, 0.1, 0.1), ('smurf', 'neptune', 'back', 'satan', 'ipsweep', 'portsweep', 'warezclient', 'normal')) is returned.

Figure 8:
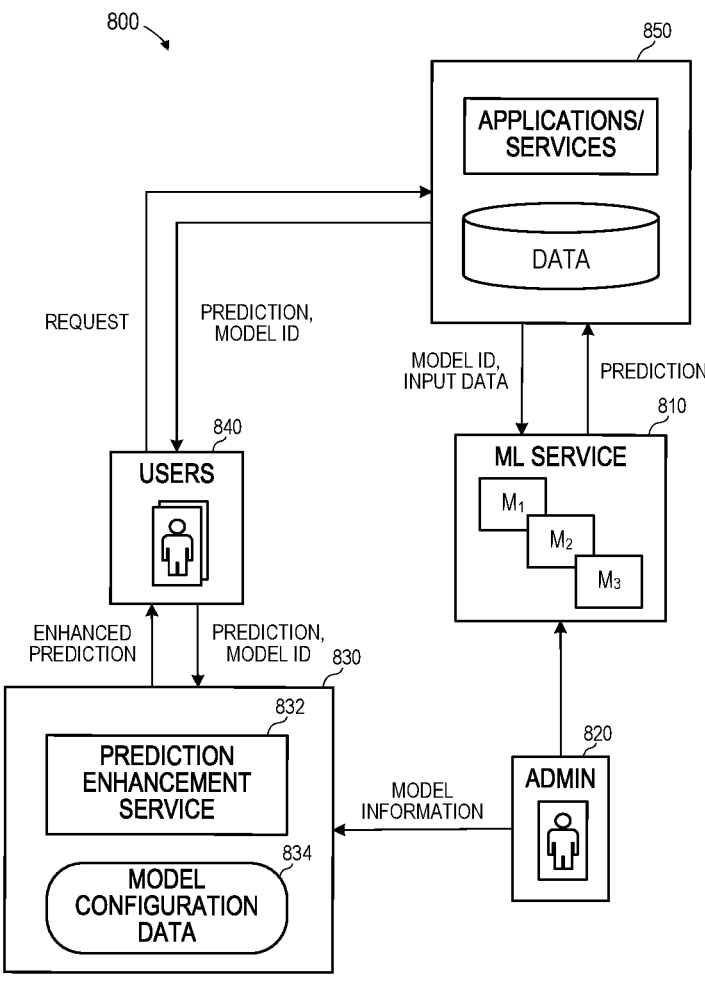
FIG. 8 is a block diagram of an architecture to enhance machine learning model predictions received from an application or service according to some embodiments.

FIG. 8 is a block diagram of architecture 800 to enhance machine learning model predictions received from an application or service according to some embodiments. Administrator 820 may create model configuration data 834 for each of models $M_1$, $M_2$, $M_3$ of machine learning service 810 as described above. Users 840 may operate respective computing devices to request functionality from applications and/or services of server 850, for example by executing an application to call an application programming interface exposed by the applications and/or services. In other embodiments, a user 840 may execute a Web browser to access a home page associated with the applications and/or services.

The applications and/or services are associated with corresponding stored data based on which the applications and/or services provide functionality to users 840. Some functionality may require use of one or more of models $M_1$, $M_2$, $M_3$. For example, a user 840 may request a classification of observed network activity from an application of server 850. The application is aware of one of models $M_1$, $M_2$, $M_3$ which has been trained to classify network activity. The application therefore forwards the model ID of the model and network activity data to service 810 and receives a prediction in return.

The prediction and the model ID are returned to the requesting user 840. The user 840 may then request an enhanced prediction from prediction enhancement service 832 as described above. The request includes the model ID and the received prediction, which are used in conjunction with corresponding model configuration data 834 to generate an enhanced prediction as also described above.

Figure 9:
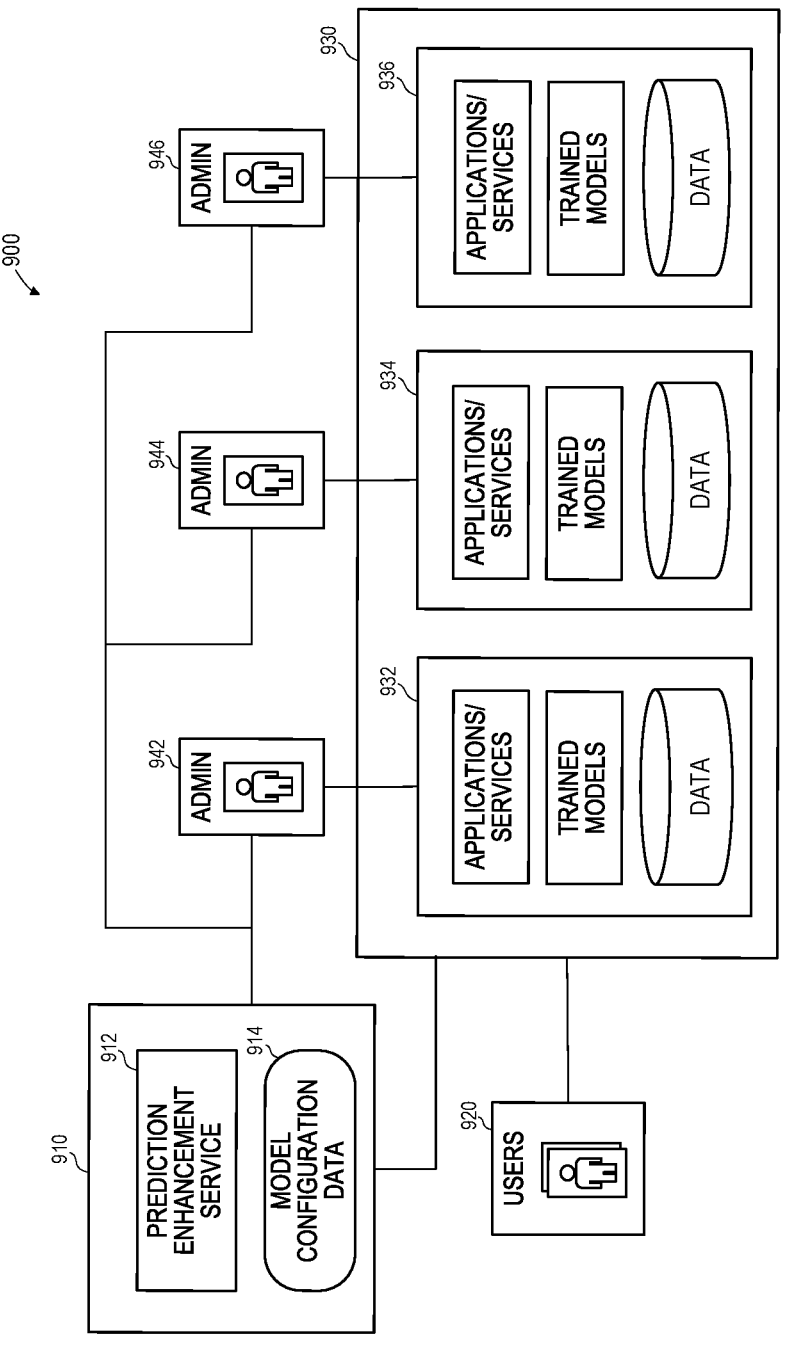
FIG. 9 is a block diagram of an architecture to provide enhanced machine learning model predictions to disparate applications or services according to some embodiments.

FIG. 9 is a block diagram of architecture 900 to provide enhanced machine learning model predictions to disparate applications or services according to some embodiments. According to architecture 900, users 920 interact with computing landscape 930 including servers 932, 934 and 936. Embodiments are not limited to three servers. Each of servers 932, 934 and 936 may provide one or more applications and/or services to users 920. Each of users 920 may be authorized to access one or more of the applications and/or services. That is, not all of users 920 are able to access a same subset of the applications and/or services according to some embodiments.

Various ones of the applications and/or services may utilize trained models to provide functionality. Administrators 942, 944 and 946 respectively administer (e.g., configure, manage) the applications, services and trained models on servers 932, 934 and 936. Such administration may include creating model configuration data 914 corresponding to the trained models. During operation, any of the applications or services of servers 932, 934 and 936 may generate a prediction using a trained model and then request an enhanced prediction from prediction enhancement service 912, so long as model configuration data 914 includes configuration data corresponding to the trained model. The application or service may then return the enhanced prediction to its user 920. Accordingly, users 920 need not access or be aware of prediction enhancement service 912.

Figure 10:
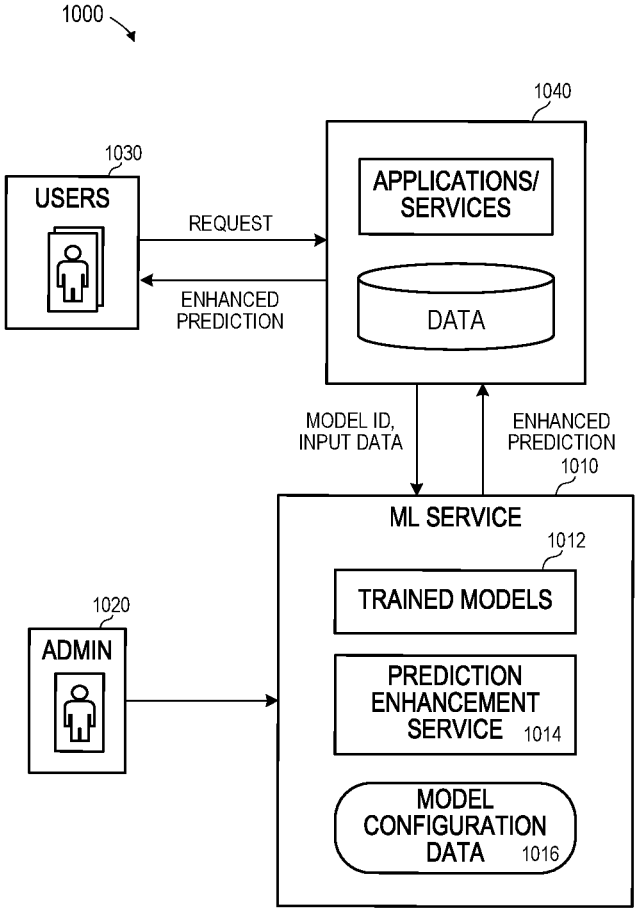
FIG. 10 is a block diagram of an architecture to provide an application or service with enhanced machine learning model predictions according to some embodiments.

FIG. 10 is a block diagram of architecture 1000 to provide an application or service with enhanced machine learning model predictions according to some embodiments. According to architecture 1000, machine learning service 1010 provides training and use of models 1012 as well as prediction enhancement service 1014. For example, administrator 1020 may interact with machine learning service 1010 to manage the definition and training of a model and to create corresponding model configuration data for storage in model configuration data 1016.

A user 1030 may interact with an application or service of server 1040 to request a classification. The application or service then forwards the model ID of a corresponding model and suitable input data to machine learning service 1010. According to architecture 1000, machine learning service 1010 operates the corresponding model to generate a prediction and generates an enhanced prediction using prediction enhancement service 1014 and model configuration data 1016 as described herein.

The enhanced prediction is returned to the application or service and may be forwarded to the user or subjected to further processing by the application or service. Accordingly, neither the application/service nor users 1030 need be aware of prediction enhancement service 1014. Architecture 1000 is not limited to a single server 1040. Embodiments may allow access to machine learning service 1010 by any number of applications/services executing on any number of servers.

Figure 11:
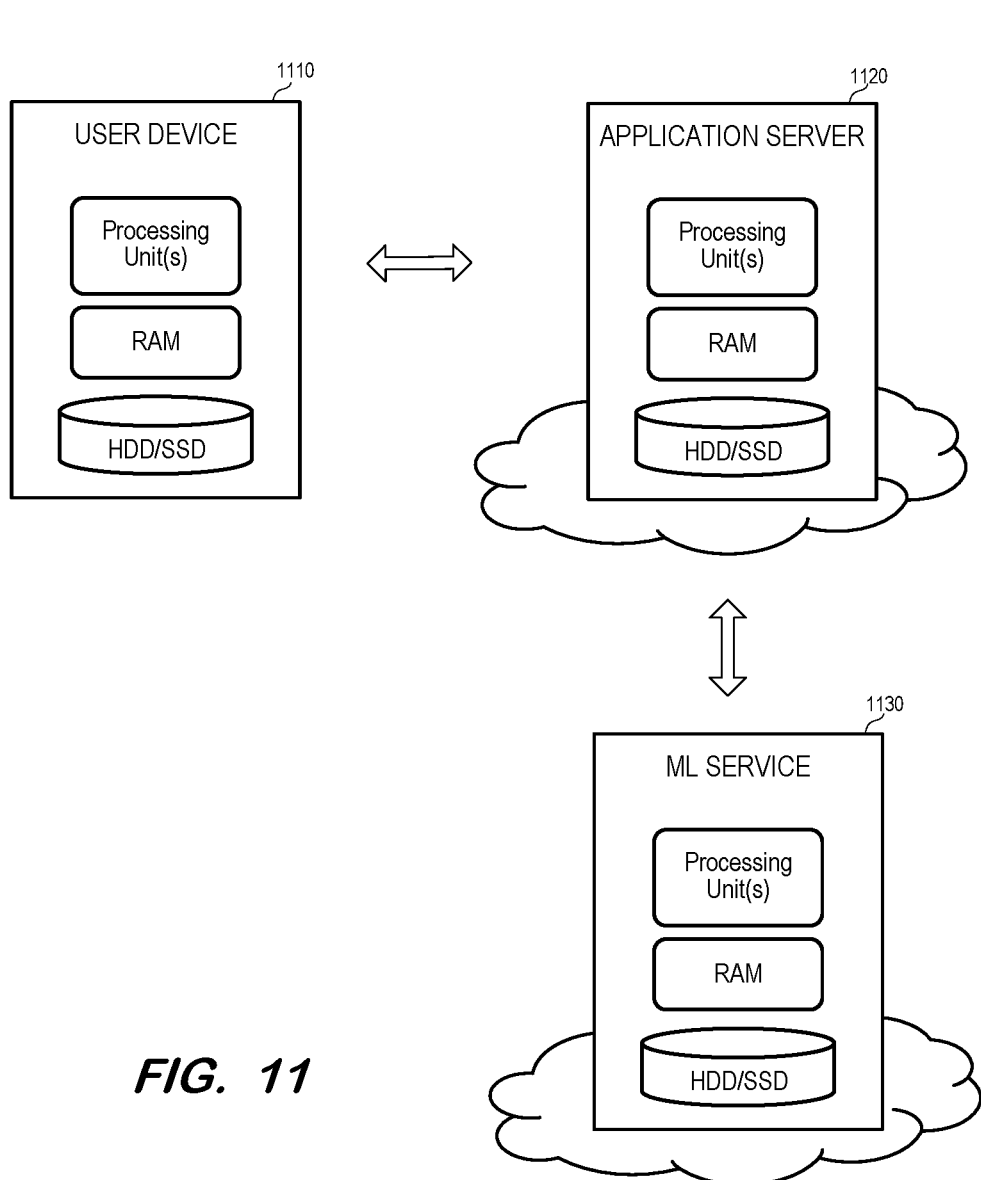
FIG. 11 is a block diagram of a cloud-based architecture implementing a system according to some embodiments.

FIG. 11 is a block diagram of 1100 cloud-based architecture implementing architecture 1000 according to some embodiments. Application server 1120 and machine learning service 1130 may comprise cloud-based compute resources, such as one or more virtual machines, allocated by a public cloud provider providing self-service and immediate provisioning, autoscaling, security, compliance and identity management features.

A user may operate user device 1110 to interact with user interfaces of a service or application provided by application server 1120. Each of these services or applications may operate in conjunction with data stored local and/or on one or more remote data storage systems (not shown). Machine learning service 1130 may provide classification model instantiation, training and inference as well as prediction enhancement as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architectures described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid-state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:
1. A system comprising:
    a storage device; and a processor to execute processor-executable program code stored on the storage device to cause the system to:

receive an identifier of a machine learning classification model and a prediction generated by the machine learning classification model;

identify model configuration data associated with the machine learning classification model;

modify the prediction based on the model configuration data to generate an enhanced prediction comprising calibrated probabilities;

modify the enhanced prediction based on an indication of similarities between classes of the machine learning classification model included in the model configuration data, the modification of the enhanced prediction comprising a determination, based on the similarities, of a first class of the classes associated with a highest probability and a second class associated with a highest probability of all classes which are not similar to the first class, and normalization of the probabilities associated with the second class and all classes associated with a lower probability than the second class and return the enhanced prediction.

2. A system according to claim 1, the processor to execute processor- executable program code stored on the storage device to cause the system to:

modify the enhanced prediction based on the model configuration data to adapt the enhanced prediction to a balanced input data set.

3. A system according to claim 2, wherein the model configuration data comprises a value associated with each class of the machine learning classification model which represents a number of observations corresponding to that class in a training set used to train the machine learning classification model, and wherein modification of the enhanced prediction is based on the values associated with each class of the machine learning classification model.

4. A system according to claim 2, the processor to execute processor-executable program code stored on the storage device to cause the system to:

modify the modified enhanced prediction based on similarities between classes of the machine learning classification model, wherein the model configuration data comprises the similarities.

5. A system according to claim 4, wherein modification of the modified enhanced prediction comprises determination, based on the similarities, of a first class of the classes associated with a highest probability and a second class associated with a highest probability of all classes which are not similar to the first class, and normalization of the probabilities associated with the second class and all classes associated with a lower probability than the second class.

6. A computer-implemented method comprising:

receiving an identifier of a machine learning classification model and a prediction generated by the machine learning classification model;

identifying model configuration data associated with the machine learning classification model;

modifying the prediction based on the model configuration data to generate an enhanced prediction comprising calibrated probabilities;

modifying the enhanced prediction based on an indication of similarities between classes of the machine learning classification model included in the model configuration data, the modifying of the enhanced prediction including determining, based on the similarities, of a first class of the classes associated with a highest probability and a second class associated with a highest probability of all classes which are not similar to the first class and normalizing the probabilities associated with the second class and all classes associated with a lower probability than the second class; and returning the enhanced prediction.

7. A method according to claim 6, further comprising:

modifying the enhanced prediction based on the model configuration data to adapt the enhanced prediction to a balanced input data set.

8. A method according to claim 7, wherein the model configuration data comprises a value associated with each class of the machine learning classification model which represents a number of observations corresponding to that class in a training set used to train the machine learning classification model, and wherein modification of the enhanced prediction is based on the values associated with each class of the machine learning classification model.

9. A method according to claim 7, further comprising:

modifying the modified enhanced prediction based on similarities between classes of the machine learning classification model, wherein the model configuration data comprises the similarities.

10. A method according to claim 9, wherein modifying the modified enhanced prediction comprises:

determining, based on the similarities, of a first class of the classes associated with a highest probability and a second class associated with a highest probability of all classes which are not similar to the first class, and normalizing the probabilities associated with the second class and all classes associated with a lower probability than the second class.

11. A non-transitory medium storing processor-executable program code, the program code executable to cause a system to:

receive an identifier of a machine learning classification model and a prediction generated by the machine learning classification model;

identify model configuration data associated with the identifier of the machine learning classification model, the model configuration data comprising a calibration function;

modify the prediction based on the calibration function to generate an enhanced prediction comprising calibrated probabilities;

modify the modified enhanced prediction based on an indication of similarities between classes of the machine learning classification model included in the model configuration data, the modifying of the modified enhanced prediction comprising a determination, based on the similarities, of a first class of the classes associated with a highest probability and a second class associated with a highest probability of all classes which are not similar to the first class, and normalization of the probabilities associated with the second class and all classes associated with a lower probability than the second class; and return the enhanced prediction.

12. A medium according to claim 11, the program code executable to cause a system to:

modify the enhanced prediction based on the model configuration data to adapt the enhanced prediction to a balanced input data set.

13. A medium according to claim 12, wherein the model configuration data comprises a value associated with each class of the machine learning classification model which represents a number of observations corresponding to that class in a training set used to train the machine learning classification model, and wherein modification of the enhanced prediction is based on the values associated with each class of the machine learning classification model.

14. A medium according to claim 11, the program code executable to cause a system to:

modify the enhanced prediction based on similarities between classes of the machine learning classification model, wherein the model configuration data comprises the similarities.

* * * * *